US006480872B1

(12) United States Patent
Choquette (10) Patent No.: US 6,480,872 B1
(45) Date of Patent: Nov. 12, 2002

(54) FLOATING-POINT AND INTEGER MULTIPLY-ADD AND MULTIPLY-ACCUMULATE

(75) Inventor: Jack H. Choquette, Los Altos, CA (US)

(73) Assignee: SandCraft, Inc., Santa Clara, CA (US)

( * ) Notice: Subject to any disclaimer, the term of this patent is extended or adjusted under 35 U.S.C. 154(b) by 0 days.

(21) Appl. No.: 09/235,148

(22) Filed: Jan. 21, 1999

(51) Int. Cl.[7] .............................. G06F 7/00; G06F 7/38
(52) U.S. Cl. ...................... 708/501; 708/523; 708/603
(58) Field of Search ................................ 708/204, 490, 708/523, 495, 501, 503, 505

(56) References Cited

U.S. PATENT DOCUMENTS

| 4,594,679 A | * | 6/1986 | George et al. ............... 708/503 |
| 4,620,292 A | * | 10/1986 | Hagiwara et al. ........... 708/501 |
| 4,953,119 A | * | 8/1990 | Wong et al. ................. 708/513 |
| 5,301,137 A | * | 4/1994 | Matsuo et al. .............. 708/501 |

* cited by examiner

Primary Examiner—Chuong Dinh Ngo
(74) Attorney, Agent, or Firm—Blakely, Sokoloff, Taylor & Zafman LLP (57) ABSTRACT

A method and a device including, in one embodiment, a multiply array and at least one adder to perform a floating-point multiplication followed by an addition when operands are in floating-point format. The device is also configured to perform an integer multiplication followed by an accumulation when operands are in integer format. The device is further configured to perform a floating-point multiply-add or an integer multiply-accumulation in response to control signals. In another embodiment, the device contains an adder and the adder is capable of performing a floating-point addition and an integer accumulation. The adder is configured to be extra wide to reduce operand misalignment. Moreover, the device stalls the process in response to operand misalignment.

20 Claims, 8 Drawing Sheets

FLOATING-POINT AND INTEGER MULTIPLY-ADD AND MULTIPLY-ACCUMULATE

BACKGROUND OF THE INVENTION

1. Field of the Invention

The present invention relates to the field of computer systems. More specifically, the present invention relates to the area of arithmetic processing devices.

2. Description of the Related Art

Conventional high performance execution units as commonly used in computer systems often contain at least one floating-point unit ("FPU") and one integer unit ("IU") for performing arithmetic calculations. A typical execution unit, which can be either CSIC or RISC architectures, contains two separate data paths to handle floating-point data in one data path and integer data in another data path. Traditionally, FPU handles floating-point data path, while IU controls integer data path.

The IU commonly also handles fixed-point data. A fixed-point data format contains fraction portion. However, the fixed-point data format does not have no exponent portion. Thus, the fixed-point data format can be considered a branch of integer data format.

FPU typically contains a circuit of floating-point multiply-add ("FP Madd") for performing a function of floating-point multiplication followed by an addition. Similarly, IU contains a circuit of integer multiply-accumulate ("Int Macc") for performing a function of integer multiplication followed by an accumulation.

Figure 1:
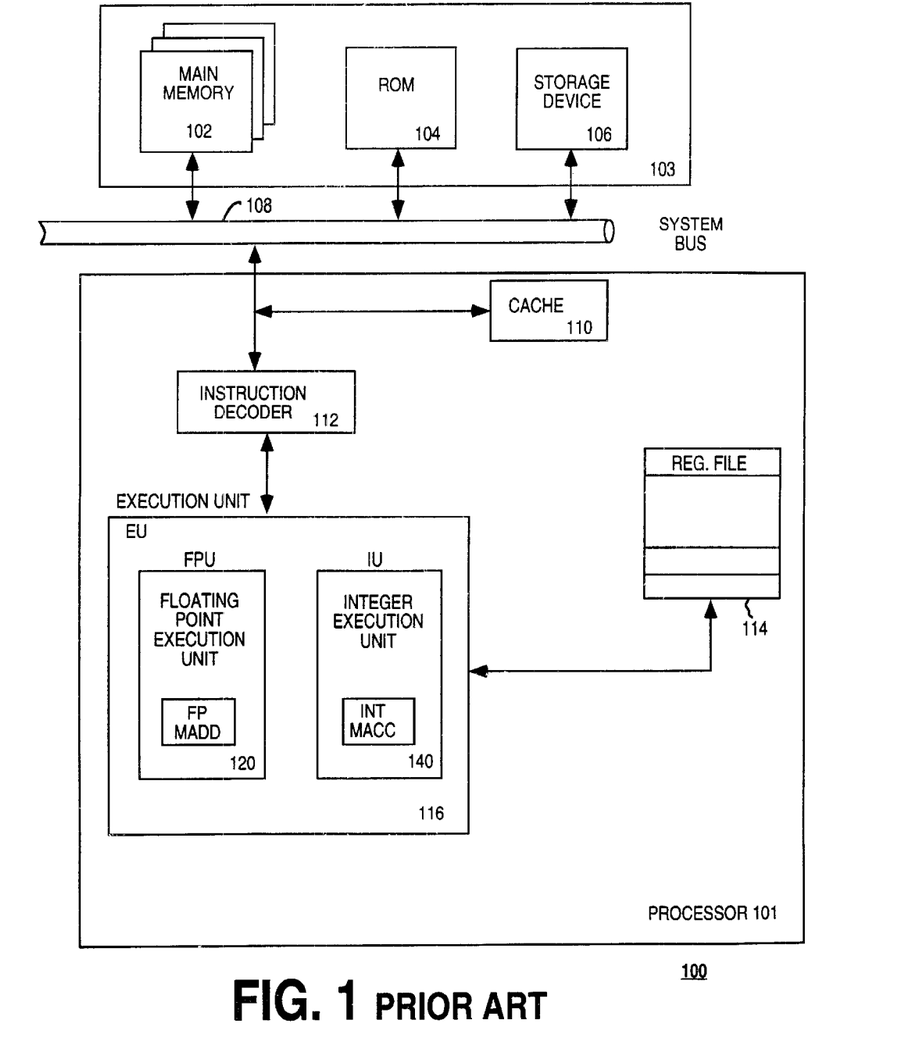
FIG. 1 illustrates a conventional computer system.

FIG. 1 illustrates a conventional computer system 100, which includes a processing unit 101, a system bus 108, and a memory unit 103. The memory unit 103 further includes system main memory 102, read-only memory ("ROM") 104, and storage device 106. The processing unit 101 typically contains an execution unit 116, an instruction decoder 112, a cache memory 110, and a register file 114. The execution unit 116 usually includes a floating-point unit 120 and an integer execution unit 140 where FPU 120 further contains a FP Madd circuit and IU 140 contains an Int Macc circuit. The FP Madd circuit is used to perform floating-point multiplication and additions, while the circuit of Int Macc performs integer multiplication and accumulations.

Figure 2:
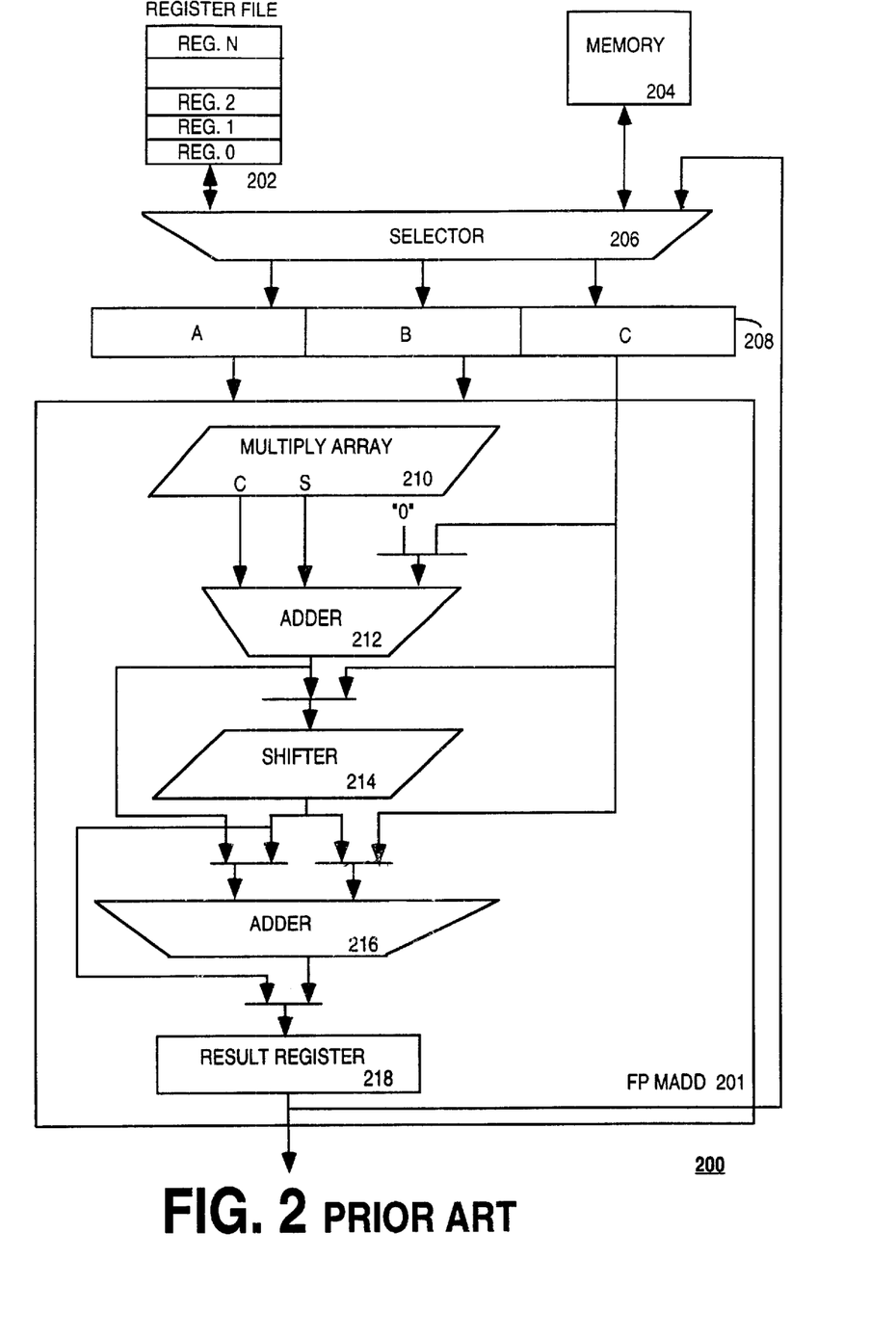
FIG. 2 illustrates a typical floating-point execution unit.

FIG. 2 illustrates a conventional pipeline design FPU 200. FPU 200 contains a FP Madd circuit 201, a set of working registers 208, a selector 206, a register file 202, and a memory device 204. The register file 202 and the memory device 204 are used to store floating-point data and the working registers 208 are used to store operands, which will be used for the next arithmetic calculations. The selector 206 is generally used to select operands to be stored in the working register 208 from either the register file 202 or the memory device 204.

The FP Madd circuit 201 typically contains a multiply array 210, a first adder 212, a shifter 214, a second adder 216, and a result register 218. The multiply array 210 performs a floating-point multiplication between a first and second operand. The output of multiply array 210 commonly contains carry and sum portions. After the multiplication, either adder 212 or adder 216 performs a floating-point addition between a third operand and the result of the multiplication. The shifter 214 may be used to perform an operand alignment or a normalization.

An operand alignment typically takes place before the FP addition where the multiply result and the third operand are aligned so that the operands can be properly added. An operation of normalization is typically performed after the FP addition where the most significant bit (MSB) of the result from the addition needs to be shifted to the MSB of the mantissa. It should be noted that the operations between alignment and normalization are typically mutual exclusive.

Referring back to FIG. 2, a FP multiply is performed in a multiply array 210. If an operand alignment is required, the adder 212 is bypassed. The operand alignment is then performed in the shifter 214 and the FP addition is subsequently performed in the adder 216. Likewise, if a normalization is required, the FP addition is performed in the adder 212. The normalization is then performed in the shifter 214 and the adder 216 is subsequently bypassed. If no operand alignment and normalization are required, the FP addition can be performed in either the adder 212 or the adder 216.

Moreover, a FP multiply accumulation is typically an arithmetic operation where the result of the first FP Madd is used as the third operand for the second FP Madd. For example, the data stored in the result register 218 is bypassed to working register C 208 as a third operand for the next FP Madd operation. It should be noted that other circuits, such as a rounding circuit, an exponent circuit, or an adjustment circuit for minor shifts, such as 1 or 2 bit adjustment, may be included in the FP Madd circuit 201.

Figure 3:
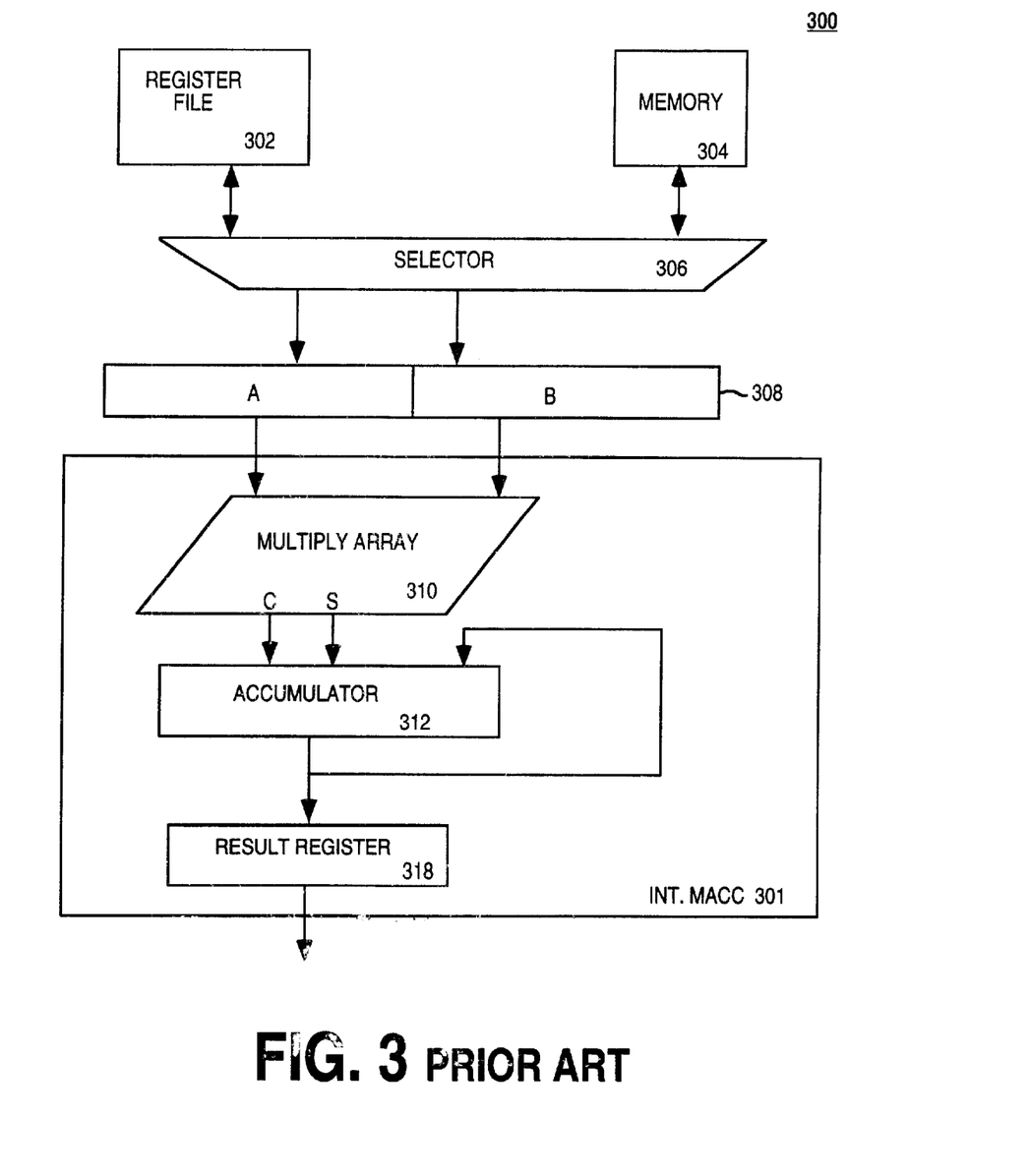
FIG. 3 illustrates a typical integer execution unit.

FIG. 3 illustrates a conventional IU 300 within a pipeline design. The IU 300 typically contains an Int Macc circuit 301, a set of working registers 308, a selector 306, a register file 302 and a memory unit 304. The register file 302 and the memory device 304 are used to store integer data and the working registers 308 are used to store integer operands, which will be used for the next integer arithmetic calculations. The selector 306 is used to select operands to be stored in the working register 308 from either the register file 302 or the memory device 304. The Int Macc circuit 301 further contains a multiply array 310, an accumulator 312, and a result register 318. The multiply array 310 performs an integer multiplication, while the accumulator 312 performs an integer accumulation.

Referring back to FIG. 1, the execution unit 116 contains at least one FP Madd circuit and one Int Macc circuit. FP Madd and Int Macc circuits both contain a multiply array and adder circuits, and both are capable of performing multiplication followed by summation where a summation can be either an addition or an accumulation. Moreover, a layout of a multiply array or adder circuit traditionally requires a large portion of silicon area within a chip. For example, a type 64-bit multiply array circuit could take 10 percent of silicon area of a chip to manufacture. Duplicated multiply arrays and adder circuits within FP Madd circuit and Int Macc circuit not only costs silicon area of a chip, but also slows down the overall performance. Therefore, it is desirable to have a multiply-add that is capable of handling both floating-point and integer data. As will be seen, one embodiment of the present invention provides a multiply-add device that is capable of performing both floating-point and integer multiply-add functions using one set of multiply array and adder circuits.

SUMMARY OF THE INVENTION

The present invention provides a device used in computer systems for performing floating-point multiply-add and integer multiply-accumulate operations.

In one embodiment, the device comprises a multiplier and at least one adder for performing a floating-point multiplication followed by an addition when operands are in the floating-point data format. The device is also configured to perform an integer multiplication followed by an accumulation when operands are in the integer data format. The device is further configured to perform a floating-point multiply-add or an integer multiply-accumulate in response to control signals.

In another embodiment, the device comprises a multiply array and at least two adders. The multiply array and a first adder are used to perform a floating-point multiplication followed by an addition when operands are in floating-point data format, while the multiply array and a second adder is used to perform an integer multiplication followed by an accumulation when operands are in the integer data format. The device is further configured to perform a floating-point multiply-add or an integer multiply-accumulate in response to control signals.

In another embodiment, the device contains an adder and the adder is capable of performing a floating-point addition and an integer accumulation. The adder is further configured to be extra wide to reduce operand misalignment. Moreover, the device stalls the process in response to the condition of operand misalignment.

BRIEF DESCRIPTION OF THE DRAWINGS

The present invention is illustrated by way of example and not by limitation in the accompanying figures.

DETAILED DESCRIPTION

A method and a device for performing floating-point multiply-add ("FP Madd") and integer multiply-accumulate ("Int Macc") functions are disclosed. In the following description numerous specific details are set forth in order to provide a thorough understanding of the present invention. It will be apparent, however, to one having ordinary skill in the art that the specific detail need not be employed to practice the present invention. In other instances, well known circuits or methods have not been described in detail in order to avoid obscuring the present invention.

In one embodiment, a multiply-add device is configured to be capable of performing a floating-point multiply-add and an integer multiply-accumulation function. For example, the multiply-add device performs an arithmetic function of FP Madd when operands are in the floating-point data format. Similarly, the multiply-add device performs an arithmetic function of Int Macc when operands are in the integer data format. In this embodiment, the multiply-add device first detects the data structure of the operand and subsequently determines whether a FP Madd or an Int Macc function should be performed.

In another embodiment, control signals are used to instruct the multiply-add device whether to perform a FP Madd or an Int Macc. In other words, the control signals instruct the multiply-add device to perform a FP Madd or an Int Macc function regardless of the operand data format. This embodiment is useful to implement logic algorithms. Moreover, the control signals can be driven by hardware or software.

In another embodiment, determination of whether to perform a FP Madd or an Int Macc is based on the data format of operands, but it can be overridden by control signals. For example, if control signals are inactive, the multiply-add device performs FP Madd if operands are in the floating-point data format or performs Int Macc if operands are in the integer data format. However, if the control signals are active, the multiply-add device performs arithmetical functions according to the control signals regardless the type of data format that operands contain. This embodiment provides flexible alternatives to implement logic algorithms as well as arithmetic operations.

A mathematical expression of multiply-add is $A*B+C$, where A is the multiplicand, B is the multiplier, and C is a third operand. For example, when operands are in the floating-point data format and an FP Madd function is requested, the multiply-add device first multiplies A and B, and then sums the result of multiplication with C if the result of multiplication and C are properly aligned. It should be noted that a floating-point number contains two portions, mantissa and exponent. In order to add two floating-point values correctly, the exponent and mantissa portions of operands must first be aligned before two mantissa portions can be added. Consequently, performing an alignment between two floating-point operands is often required after the multiplication during the FP Madd operation.

On the other hand, when operands are in the integer data format and Int Macc function is requested, the multiply-add device performs an integer multiplication between A and B followed by an accumulation. It should be noted that the integer data format, unlike the floating-point data format, does not contain an exponent portion.

Figure 4:
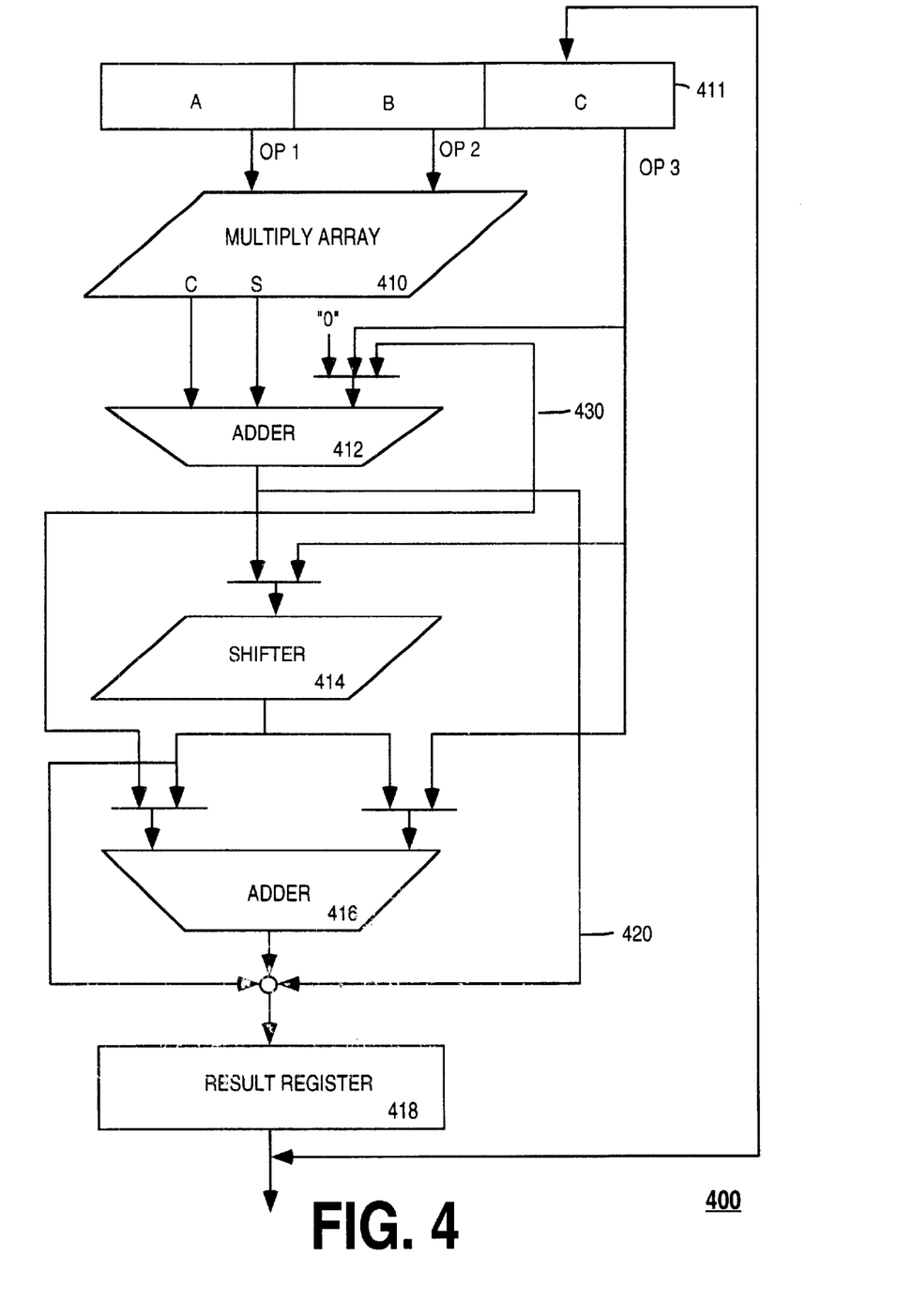
FIG. 4 illustrates an embodiment of multiply-add device, which performs floating-point multiply-add and integer multiply-accumulate functions, in accordance with the present invention.

FIG. 4 illustrates an embodiment of a multiply-add device 400, which includes working registers A, B, C 411, a multiply array 410, a first adder 412, a shifter 414, a second adder 416, and a result register 418. The multiply array 410 is capable of performing floating-point and integer multiplication. In operation, the multiply array 410 multiplies operand 1 ("op1") to operand 2 ("op2") from working register A and B as shown in FIG. 4, and passes the result of the multiplication to the first adder 412, the shifter 414, and the result register 418.

If the data is in the integer data format and Int Macc function is requested, the device 400 performs an integer multiplication. After the multiplication, the adder 412 accumulates a third integer operand ("op3"), which may come from working register C or the output of the adder 412 from previous operation, or a constant zero with the result of the multiplication. Upon completion of the accumulation, the result of the accumulation is stored in the result register 418 using the bypass 420.

If operands are in the floating-point data format and a FP Madd function is requested, the device 400 performs a floating-point multiplication. After multiplication, a FP addition is performed in the adder 412 if operands are properly aligned. However, the adder 412 may be bypassed if an operand alignment is required. One of the two operands, commonly the smaller number of the two operands, is passed to the shifter 414 where the operand alignment is performed. Upon proper alignment between the operands, a FP addition is performed in the adder 416 and the result of the addition is stored in the result register 418.

Similarly, if a normalization is required after a Madd operation, the FP addition is performed in the adder 412 after the multiplication. The result of the addition is subsequently passed to the shifter 414 where a normalization is performed. After the normalization, the adder 416 is bypassed and the result of the shifter 414 is forwarded to result the register 418.

In a case of FP multiply accumulation, one embodiment of the device 400 employs a bypass path 430 which allows the current Madd result to be immediately forwarded back to the adder 412 for the next Madd operation. However, the bypass path 430 can be properly used only if the first Madd result is computed at Adder 412 and the second Madd operands are correctly aligned. If the operands are misaligned, an operand alignment is necessary before the next addition can take place. In this case, the next addition operation takes a hiccup or stall so that the operand can be passed to the shifter 414 where an alignment is performed. In one embodiment, the next addition operation can be subsequently performed in the adder 416 after the operands are properly aligned. In another embodiment, the next Madd operation may be performed in the adder 412 when the operands are aligned and stored at the working register C.

Figure 5:
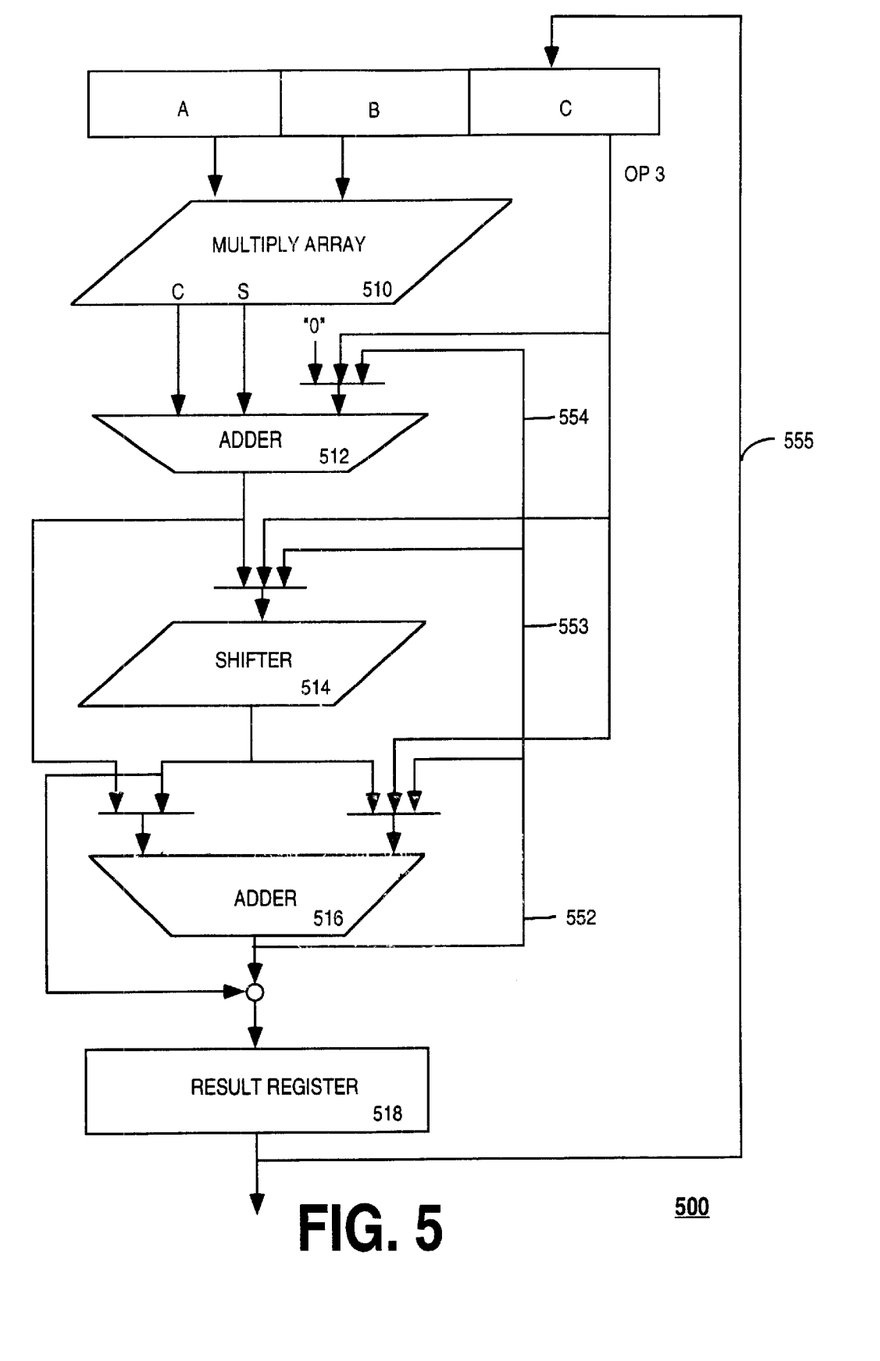
FIG. 5 illustrates another embodiment of multiply-add device, which contains at least two adders and the second adder performs the function of integer accumulation, in accordance with the present invention.

FIG. 5 illustrates another embodiment of a multiply-add device 500, which includes a multiply array 510, a first adder 512, a shifter 514, a second adder 516, and a result register 518. In this embodiment, the second adder 516 is configured to implement floating-point additions and integer accumulations, while the multiply array 510 is configured to perform floating-point multiplication and integer multiplication. In operation, the multiply array 510 first performs a multiplication and then the result of the multiplication is passed to the second adder 516 for summation.

If operands are in the integer data format and the function of the Int Macc is requested, the device 500 performs an integer multiplication using the multiply array 510. After the multiplication, the adder 512 performs an addition between the result of the multiplication and a third operand. If operands are in the floating-point data format and FP Madd is requested, the device 500 performs a floating-point multiplication followed by a FP addition. Implementing a FP Madd function is similar to FIG. 2 as described above.

In one embodiment, three bypass paths 552, 553, 554 are used to implement operations of FP multiply accumulation. The bypass path 552 is used to pass the first Madd result back to the adder 516 as a third operand to the second Madd operation when neither normalization nor operand alignment of the third operand is required. On the other hand, when an operand alignment of the third operand is required, the bypass path 553 is used to pass the result of the first Madd to the shifter 514 where the alignment is performed. Similarly, when a normalization is required, the bypass path 554 is used so that the shifter 514 can perform a normalization.

FIG. 5 also illustrates different lengths of bypass paths. For example, the bypass path 552 is a short path while the bypass path 554 is a long path. Short path commonly consumes less time for data to travel from a source to a destination while the long path takes longer time for data to travel. Consequently, long bypass paths cause more execution stalls or hiccups than short bypass paths. Accordingly, one embodiment of the device 500 uses the shortest bypass paths possible for reducing execution stalls. In another embodiment, an integer multiply accumulate uses the adder 516 and the bypass path 522 for accumulations.

The present invention involves a multiply-add function that performs a multiplication followed by a summation independent of data formats, which could be either floating-point or integer data format. In other words, the present invention unifies FP Madd circuit with Int Macc circuit so that the unified multiply-add device not only costs less to manufacture, but also enhances overall computing performance.

Moreover, the unified multiply-add device of FP Madd and Int Macc circuits may share logic and circuits on one or multiple integrated circuits. Also, depending on applications, the implementation of the unified multiply-add device can be completed within one or multiple clock cycles. Due to the different data structures between floating-point and integer format, unified functions of FP Madd and Int Macc must also provide solutions for handling both integer and floating-point implementations.

For the floating-point data format, before corresponding mantissa portions can be added, the exponent and mantissa portions must be properly aligned. To resolve floating-point misalignment, one embodiment of the present invention passes the misaligned operand to a shifter or an aligner for alignment. After the operands are properly aligned, the floating-point addition is performed. It should be noted that the floating-point exponent alignment between the operands may be performed at the same time as the floating-point multiplication to enhance the performance.

On the other hand, operand alignment and normalization are not needed for Int Macc because integer data format does not need operand to be aligned or normalized before an integer operation. Since FP operation requires alignments and normalizations while integer operation does not require such functions, reducing the number of alignment and normalization operations enhances overall performance for the unified multiply-add device.

Figure 6:
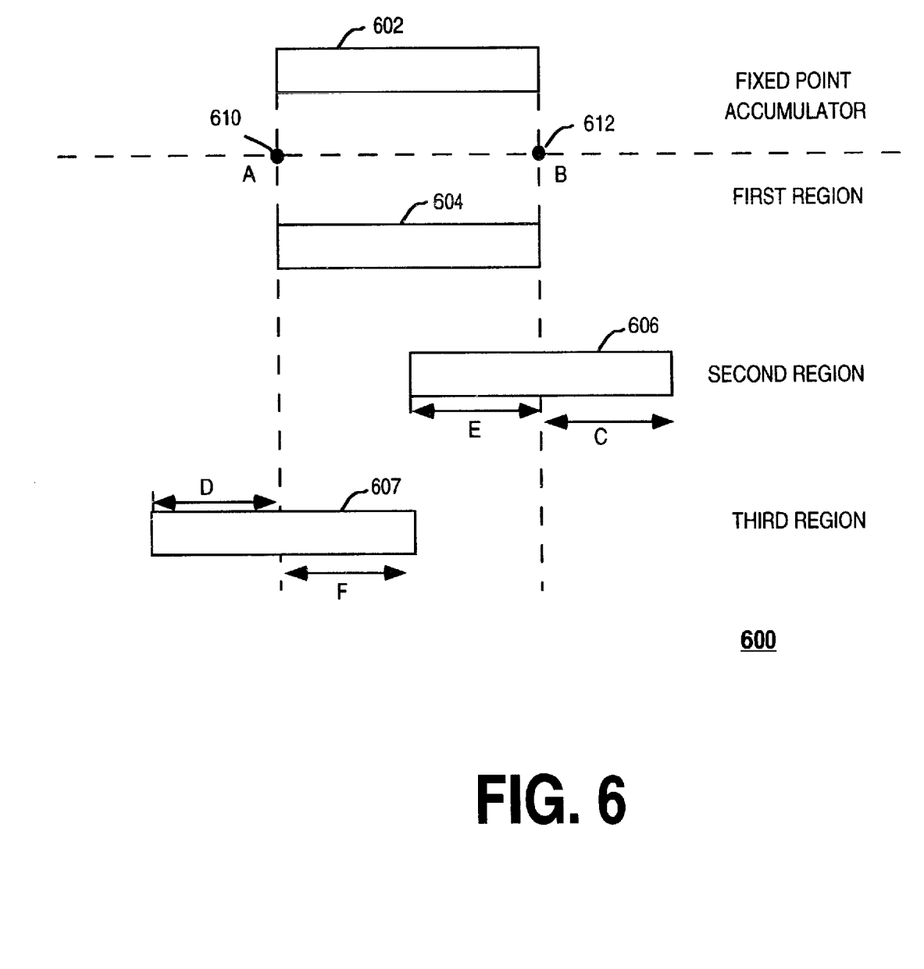
FIG. 6 illustrates an example of alignment of fixed-point operands in accordance with one embodiment of the present invention.

FIG. 6 illustrates an example of alignment of floating point operands 600 in accordance with one embodiment of the present invention. It should be noted that normalization and alignment are frequently performed since many FP operations require normalization or alignment before executing the next FP operations. For example, upon completion of an accumulation, the fixed-point result can be converted into the floating point data format by normalizing the fixed-point result. The result of the normalization can then be read out and written into a floating point register and the result can be used by subsequent floating point operations.

In one embodiment, the precision of the fixed-point accumulator is extended to reduce the need of alignment or normalization before the next FP operations. By extending the precision of the accumulator, many cases of alignment and normalization can be eliminated. Accordingly, the FP multiply accumulate can use the same short bypass paths as the integer multiply accumulate to implement FP operations.

In FIG. 6, it shows an accumulator 600, a first region 604, a second region 606, and a third region 607. The width of the accumulator 602 is the width of the adder, which may also perform mantissa additions during floating-point computations. The width of the accumulator may be two words wide and a word could be 64 bits wide. In FIG. 6, bit numbers between point A 610 and point B 612 may be two words wide and the MSB of the accumulator 602 is at point A 610, while the least significant bit ("LSB") of the accumulator 602 is at point B 612.

The accumulator 602 performs a floating point accumulation if multiply result is situated within the first region 604 since the first region is situated within the width of the accumulator 602. Also, the accumulator 602 is able to perform a floating point accumulation if multiply result is in the second region 606. It should be noted that the second region 606 contains two sub-regions, C and E. During the integer accumulating processing, operand bits situated within the E sub-region are accumulated, whereas operand bits situated within the C sub-region can be discarded. The discarded bits in the C sub-region generally do not affect the result of the accumulation because the discarded bits are situated beyond the LSB of the accumulator.

The present invention will take a hiccup or stall when a portion of multiply result is situated in D sub-region of the third region 607. The third region also contains two sub-regions, D and F, where the F sub-region is situated within the MSB of the accumulator 702. However, the D sub-region is situated beyond the MSB of the accumulator and thus, discarding the bits in the D sub-region will affect the result of the accumulation. Accordingly, a floating point misalignment occurs when at least one bit of an operand is situated within the D sub-region. The described embodiment works well if operands are seldom situated in the D sub-region. On the other hand, the system takes a hiccup or a stall so that the misaligned multiply result can be properly aligned. The accumulator can accumulate operands that fall within region 604 or region 606.

Figure 7:
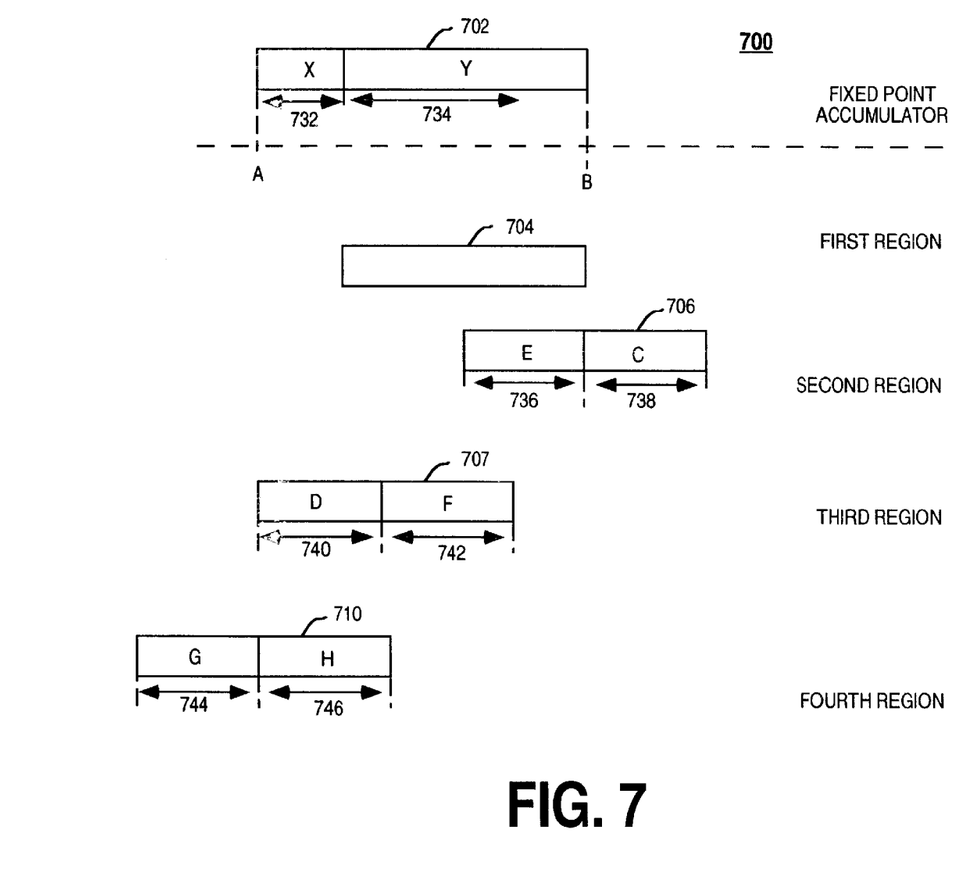
FIG. 7 illustrates another example of alignment for fixed-point operands having an extra wide adder in accordance with one embodiment of the present invention.

FIG. 7 illustrates an embodiment of alignment solution for fixed-point accumulation 700 in accordance with another embodiment of the present invention. FIG. 7 shows an accumulator 702, a first region 704, a second region 706, a third region 707, and a fourth region 710. In this embodiment, the accumulator 702 is configured to be extra wide. The accumulator 702 contains Y portion 734, which is a regular width of an accumulator, and X portion 732, where additional bits are added to extend the range of the accumulator 702. The X portion 732 can be a half word, a word, or double word long.

The accumulator 702 performs a floating point accumulation if operands are situated within the first region 704 since the first region is situated within the width of the accumulator 702. The accumulator 702 can also perform a floating point accumulation if operands are situated within the second region 706, which contains two sub-regions, E and C, as shown in FIG. 7. During the floating point accumulating processing, operand bits situated within the E sub-region will be accumulated, whereas operand bits situated within the C sub-region are discarded. Since the C sub-region is situated beyond the LSB of the accumulator, discarding bits in the C sub-region will generally not affect the result of the accumulation.

Moreover, because of the X portion 832 in the accumulator 702, the accumulator 702 can properly perform a floating point accumulation if operands are situated in the third region 707, where it is divided into two sub-regions, D 740 and F 742, as shown in FIG. 7. The F sub-region 742 is situated within the Y portion 734 of the accumulator 702, while the D sub-region 740 is situated within the X portion 732 of the accumulator 702. In other words, if a multiply result is situated in the D sub-region 740, an accumulator without X portion 732 would not be able to perform the accumulation and would have take a stall for alignment of the accumulator. Therefore, the extra wide accumulator 702 reduces the stalls and in turn, enhances the performance.

On the other hand, the present invention will take a hiccup or stall when at least one bit of a multiply result extends into G sub-region 744 of the fourth region 710. The fourth region 710 contains two sub-regions, G 744 and H 746, where the H sub-region 746 is situated within the X portion 732 of the accumulator 702. Since the G sub-region 744 is situated beyond the MSB of the accumulator 702, discarding bits within the G sub-region 744 will cause the result of the accumulation to be incorrect. Accordingly, the present invention stalls the process when one operand or a portion of the operand extends into the G sub-region 744. Depending on the application, operands that fall within the G sub-region are generally infrequent and therefore, this embodiment generally works well with most applications.

Another embodiment of present invention for resolving operand misalignment is using programmable code. Software or compiler may be used to initialize or bias operands to avoid misalignment.

Figure 8:
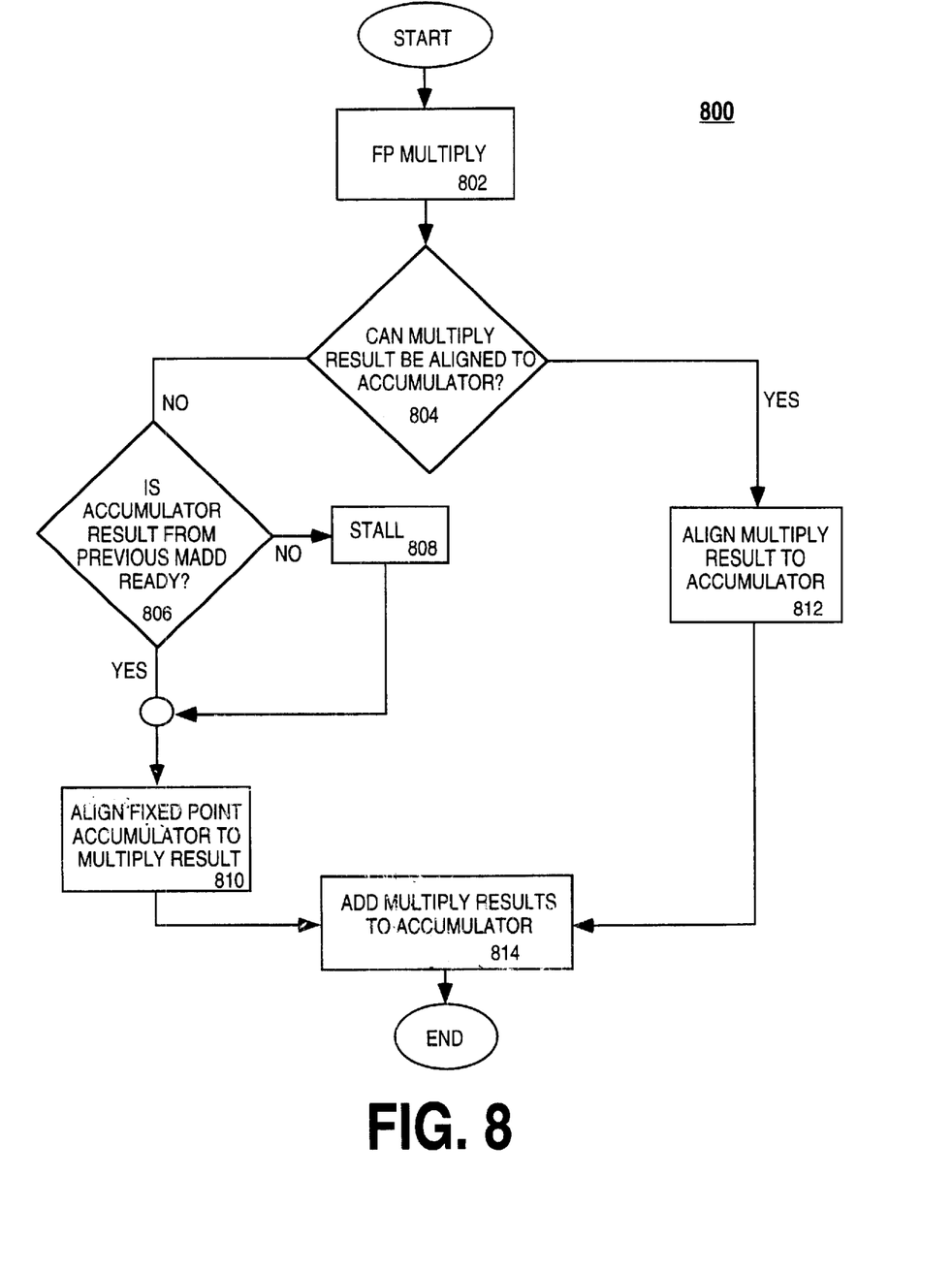
FIG. 8 is a flow chart of one embodiment of a multiply-add device, which performs a multiplication followed by a summation function, in accordance with the present invention.

FIG. 8 is a flow chart 800 illustrating an embodiment of a multiply-add device. The process of the flow chart 800 proceeds from a start block to block 802 where a multiplication is performed. Upon completion of the multiplication, the process proceeds from block 802 to block 804. At block 804, the process determines whether the multiply result, which is the result of the previous multiplication, is properly aligned within the accumulator. If block 804 is false, it indicates that the multiply result is misaligned. The process proceeds from block 804 to block 806.

At block 806, the process examines whether the accumulator result from previous Madd is ready. If the block 806 is true, the process proceeds from block 806 to block 810 where the process aligns fixed-point accumulator to multiply result. However, if the block 806 is false, the process proceeds from block 806 to block 808 where the process takes a stall. After block 808, the process moves from block 808 to block 810 where an alignment takes place. After block 810, the process moves to block 814 where the function of adding multiply result to accumulator is performed.

If block 804 is true, which indicates that the multiply result is properly aligned, the process proceeds from block 804 to block 812 where the process aligns multiply result to accumulator. After block 812, the process proceeds to block 814 where the process adds the multiply result to accumulator. After block 814, the process ends at the end block.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A multiply-accumulate (MACC) circuit comprising:
   a multiply array to perform floating point and integer multiplication;
   a first adder coupled to the multiply array to perform floating point and integer addition;
   a shifter coupled to the first adder;
   a second adder coupled to the shifter to perform floating point and integer addition and accumulation, wherein a precision of the second adder is greater than a precision of the multiply array, and a precision of the first adder;

a first bypass coupling an output of the second adder to an input of the second adder;

a second bypass coupling an output of the second adder to an input of the shifter;

wherein the first bypass is shorter than the second bypass.

2. The circuit of claim 1, wherein the circuit performs accumulations without normalizing a result in the second adder.

3. The circuit of claim 1, wherein the circuit is capable of determining whether a multiplication result from the multiply array can be aligned with a first result in the second adder.

4. The circuit of claim 3, wherein, if possible, based on the determination, the shifter aligns the multiplication result with the first result, the first bypass provides the first result to the second adder for accumulation.

5. The circuit of claim 3, wherein, if it is not possible, based on the determination, to align the multiplication result with the first result, the second bypass provides the first result to the shifter, and the shifter aligns the first result to the multiplication result.

6. The circuit of claim 3, wherein the determination comprises determining whether the multiplication result needs to be shifted left to align with the first result, where such shift would result in the loss of a most significant bit of the multiplication result.

7. A method of operating a multiply-accumulate (MACC) circuit comprising:

obtaining a multiplication result by multiplying a first operand and a second operand, wherein the first and second operands may be represented in integer or floating point formats;

determining whether the multiplication result can be aligned with a first result in an adder, wherein the first result is in floating point format and the precision of the first result is greater than the precision of the multiplication result;

based, at least in part on the determination, either aligning the multiplication result with the first result in the adder, or aligning the first result in the adder with the multiplication result.

8. The method of claim 7, wherein the determination comprises determining whether the multiplication result needs to be shifted to the left to align with the first result, and wherein if the multiplication result needs to be shifted to the left where such shift would result in the loss of a most significant bit of the multiplication result, the determination comprises a determination that the multiplication result cannot be aligned with the first result.

9. The method of claim 7, further comprising determining whether the adder is ready for accumulating a third operand.

10. The method of claim 9 further comprising stalling, at least partly, in response to the determination that the adder is not ready for the accumulating.

11. A computer readable medium containing instruction thereon, which when executed by a processor cause the processor to operate a multiply-accumulate (MACC) circuit by:

obtaining a multiplication result by multiplying a first operand and a second operand, wherein the first and second operands may be represented in integer or floating point formats;

determining whether the multiplication result can be aligned with a first result in an adder, wherein the first result is in floating point format and the precision of the first result is greater than the precision of the multiplication result;

based, at least in part on the determination, either aligning the multiplication result with the first result in the adder, or aligning the first result in the adder with the multiplication result.

12. The computer readable medium of claim 11, wherein the determination comprises determining whether the multiplication result needs to be shifted to the left to align with the first result, and wherein if the multiplication result needs to be shifted to the left where such shift would result in the loss of a most significant bit of the multiplication result, the determination comprises a determination that the multiplication result cannot be aligned with the first result.

13. The computer readable medium of claim 11, further comprising determining whether the adder is ready for accumulating a third operand.

14. The computer readable medium of claim 13, further comprising stalling, at least partly, in response to the determination that the adder is not ready for the accumulating.

15. A computer comprising:

a multiply-accumulate (MACC) circuit, wherein the MACC circuit comprises:

a multiply array to perform floating point and integer multiplication;

a first adder coupled to the multiply array to perform floating point and integer addition;

a shifter coupled to the first adder;

a second adder coupled to the shifter to perform floating point and integer addition and accumulation, wherein a precision of the second adder is greater than a precision of the multiply array, and a precision of the first adder;

a first bypass coupling an output of the second adder to an input of the second adder;

a second bypass coupling an output of the second adder to an input of the shifter;

wherein the first bypass is shorter than the second bypass.

16. The computer of claim 15, wherein the circuit performs accumulations without normalizing a result in the second adder.

17. The computer of claim 15, wherein the circuit is capable of determining whether a multiplication result from the multiply array can be aligned with a first result in the second adder.

18. The computer of claim 17, wherein, if possible, based on the determination, the shifter aligns the multiplication result with the first result, the first bypass provides the first result to the second adder for accumulation.

19. The circuit of claim 17, wherein, if it is not possible, based on the determination, to align the multiplication result with the first result, the second bypass provides the first result to the shifter, and the shifter aligns the first result to the multiplication result.

20. The circuit of claim 17, wherein the determination comprises determining whether the multiplication result needs to be shifted left to align with the first result, where such shift would result in the loss of a most significant bit of the multiplication result.

* * * * *